United States Patent
Zhang et al.

(10) Patent No.: US 11,222,171 B2
(45) Date of Patent: Jan. 11, 2022

(54) ENHANCED PIVOT TABLE CREATION AND INTERACTION

(71) Applicant: Microsoft Technology Licensing, LLC, Redmond, WA (US)

(72) Inventors: Yi Zhang, Bothell, WA (US); Sangeeta Mudnal, Medina, WA (US); Jingxia Xing, Beijing (CN); Xuan Zhang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/435,454

(22) Filed: Feb. 17, 2017

(65) Prior Publication Data

US 2018/0239748 A1    Aug. 23, 2018

(51) Int. Cl.
| | | |
|---|---|---|
| G06F 3/0482 | (2013.01) |
| G06F 40/18 | (2020.01) |
| G06F 3/0484 | (2013.01) |
| G06F 40/106 | (2020.01) |
| G06F 40/177 | (2020.01) |

(52) U.S. Cl.
CPC ........... *G06F 40/18* (2020.01); *G06F 3/0482* (2013.01); *G06F 3/04847* (2013.01); *G06F 40/106* (2020.01); *G06F 40/177* (2020.01)

(58) Field of Classification Search
CPC .......... G06F 17/24; G06F 17/25; G06F 40/18; G06F 40/106; G06F 40/177; G06F 3/0482; G06F 3/04847; G06T 11/60; A63F 2300/5553; A63F 2300/6623
USPC ................................ 715/201, 202, 230, 255
See application file for complete search history.

(56) References Cited

U.S. PATENT DOCUMENTS

| | | | |
|---|---|---|---|
| 7,200,615 B2 | 4/2007 | Eschbach et al. | |
| 7,805,674 B2* | 9/2010 | Chen | G06F 40/18 715/267 |
| 8,719,725 B2 | 5/2014 | Workman et al. | |
| 9,311,357 B2 | 4/2016 | Ramesh et al. | |
| 9,430,469 B2* | 8/2016 | Lam | G06F 16/00 |
| 2005/0090911 A1* | 4/2005 | Ingargiola | G06Q 40/00 700/36 |
| 2006/0224947 A1* | 10/2006 | Weber | G06F 40/18 715/210 |
| 2007/0055943 A1 | 3/2007 | Mccormack et al. | |

(Continued)

OTHER PUBLICATIONS

Kumar, Lalit, "Pivot Table Tutorial and Examples in Excel", http://techwelkin.com/pivot-table-excel, Published on: May 2, 2016, 12 pages.

"Create a named set in an OLAP PivotTable report", https://support.office.com/en-us/article/Create-a-named-set-in-an-OLAP-PivotTable-report-8148265e-f843-4300-98f5-37c74f96d770, Retrieved on: Dec. 16, 2016, 7 pages.

(Continued)

*Primary Examiner* — Kavita Stanley
*Assistant Examiner* — Jenq-Kang Chu

(57) ABSTRACT

Systems, methods, and software are disclosed herein for enhanced pivot table creation and interaction. In an implementation, a view including a formula bar is rendered in a user interface to a spreadsheet application. In response to receiving a user initialization input, the view is rendered to hide the formula bar and display a configuration bar configured to receive at least one pivot table parameter. A pivot table is generated based on the at least one pivot table parameter. The view is rendered to display the formula bar after generation of the pivot table.

17 Claims, 14 Drawing Sheets

(56) References Cited

U.S. PATENT DOCUMENTS

| | | |
|---|---|---|
| 2007/0061369 A1 | 3/2007 | Folting et al. |
| 2010/0251092 A1* | 9/2010 | Sun ...................... G06F 17/243 715/222 |
| 2013/0124957 A1 | 5/2013 | Oppenheimer et al. |
| 2015/0113378 A1 | 4/2015 | Otero et al. |
| 2016/0253308 A1 | 9/2016 | Olinger et al. |
| 2017/0124058 A1* | 5/2017 | Otero ...................... G06F 40/18 |

OTHER PUBLICATIONS

Joseph, "Excel—Create a Pivot Table Using SQL", http://web.archive.org/web/20130326234536/http:/www.spreadsheetsmadeeasy.com/excel-create-pivot-table-using-sql, Published on: Mar. 26, 2013, 17 pages.

"Create a PivotTable with an external data source", https://support.office.com/en-GB/article/Create-a-PivotTable-with-an-external-data-source-db50d01d-2e1c-43bd-bfb5-b76a818a927b, Retrieved on: Dec. 16, 2016, 5 pages.

Hong, et al., "ODK Tables: Data Organization and Information Services on a Smartphone", In Proceedings of the 5th ACM workshop on Networked systems for developing regions, Jun. 28, 2011, 6 pages.

Protalinski, Emil, "Microsoft makes Office mobile editing free, launches separate iPhone apps and preview for Android tablets", http://venturebeat.com/2014/11/06/microsoft-makes-office-mobile-editing-free-launches-separate-phone-apps-and-preview-for-android-tablets/, Published on: Nov. 6, 2014, 11 pages.

"International Search Report and Written Opinion Issued in PCT application No. PCT/US18/017729", dated May 14, 2018, 11 Pages.

* cited by examiner

ENHANCED PIVOT TABLE CREATION AND INTERACTION

TECHNICAL BACKGROUND

A spreadsheet program can be used to create and format workbooks (a collection of spreadsheets) in order to analyze data and make informed decisions, both personal and business. Workbooks or even a single spreadsheet thereof can contain large amounts of data for analysis and decision-making. Even small amounts of data may be used in the analyzing and decision processes.

How the data are presented to the user can influence the ability of the user to capture the meaning of the data in order to adequately analyze the data to make an informed decision. If the data appear to the user in a random arrangement, it can be difficult for the user to understand how the data apply to the decision that must be made. However, arranging or sorting that same data chronologically, for example, may make the user's understanding much greater.

There are many ways that data can be organized and arranged for presentation to a user. One way includes the creation of a pivot table. A pivot table report can be used to summarize, analyze, explore, and present summary data in a presentation format that is easier to understand than presentation of the data in a raw format. For some users, however, generating the pivot table can be a confusing process. This confusion in generating the pivot table may further cause the concept of the pivot table to be vague and difficult to understand for the user.

Overview

Technology is disclosed herein that simplifies the creation of pivot tables for a user. In an implementation, a user input is analyzed to identify at least one pivot table parameter. A display object is created based on the pivot table parameter and displayed. Parameters related to the pivot table parameter are displayed based on a user interaction with the display object. A pivot table is created based on the user input and based on a value of the display object.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
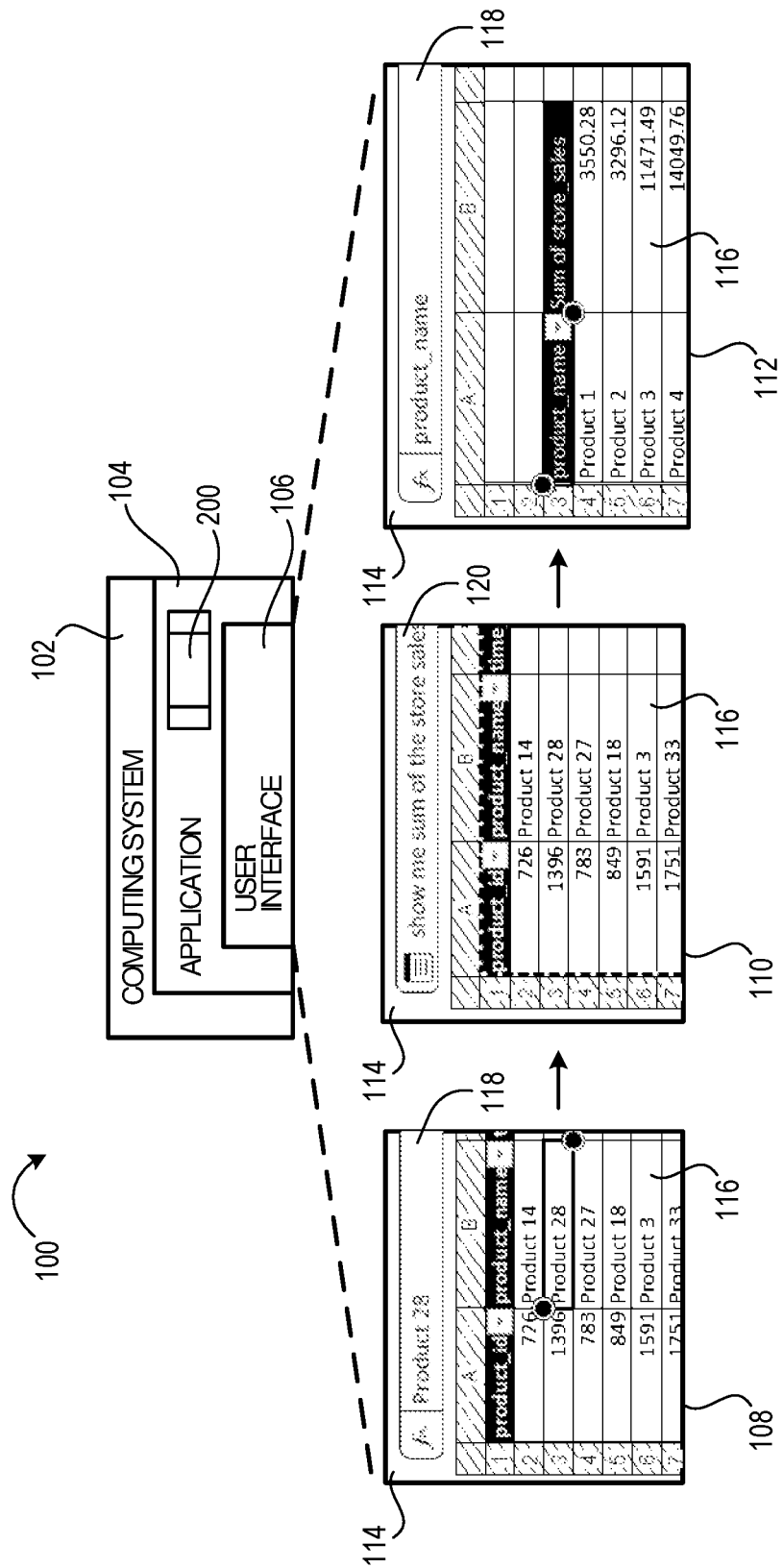
FIG. 1 illustrates an implementation of pivot table creation and interaction operations.

Technology is disclosed herein that allows a user to be coached and guided by an application in the reorganization of data into a different format. In an implementation, the application presents hints and suggestions to the user that provide sample text representing the types of user input that can be entered by the user to reorganize or reformat the data in one arrangement to another arrangement. For example, data presented in a table format may be reorganized into a pivot table format. The hints and suggestions presented to the user help to elucidate the type of inputs possible to create the other arrangement (e.g., pivot table).

Furthermore, the hints and suggestions, if selected by the user, provide a shortcut for entering the selected sample text so that the user requires less manual typing to achieve the same or similar result. The sample text in the hints and suggestions may dynamically change as user input is received in accordance with the type of user input further expected in addition to user input already received. The user may cause the creation of the other arrangement to be started after the user is finished entering the desired text or parameters necessary to create the other arrangement.

A technical effect provided by the technology disclosed herein is the ability of a user to be guided through a process of data entry to cause data to be reorganized from one formatting arrangement into a different formatting arrangement. The user can be shown sample text exemplifying user input valid for entering into an application user interface to create, for example, a pivot table. As the application receives user input, different sample text can be provided to the user to clarify additional options available for use in formatting the pivot table according to the user's preference. Keywords in the entered text can be converted into clickable objects that allow the program to display a list of similar or related options to the user.

In general, a pivot table can reorganize large amounts of data in the context of a spreadsheet application into a format that may be more easily understood in order to see comparisons, patterns, and trends in the data. For example, a pivot table can be used in some implementations to subtotal and aggregate numeric data, summarize data by categories and subcategories, and create custom calculations and formulas. The pivot table can use filtering, sorting, and grouping in some implementations to provide a desired focus to the data.

To create a pivot table, multiple input parameters are received as inputs in order to specify or define how the data should be presented in the resultant pivot table. A user can be guided through the pivot table creation process to make the process simpler and easier to understand. Especially for a small screen where crowded and detailed forms appear too small or are otherwise more difficult to use, implementations of pivot table creation described herein can ease user frustration and make the process easier to understand. Even if the user has access to a large screen, guidance through the pivot table creation process as described herein can provide increased user satisfaction.

FIG. 1 illustrates an implementation 100 that is representative of pivot table creation and interaction operations that allow for maintaining the responsiveness of a user interface to an application. Implementation 100 involves computing system 102 on which application 104 runs. When executing, application 104 drives a user interface 106 through which a user may interact with the application.

Figure 14:
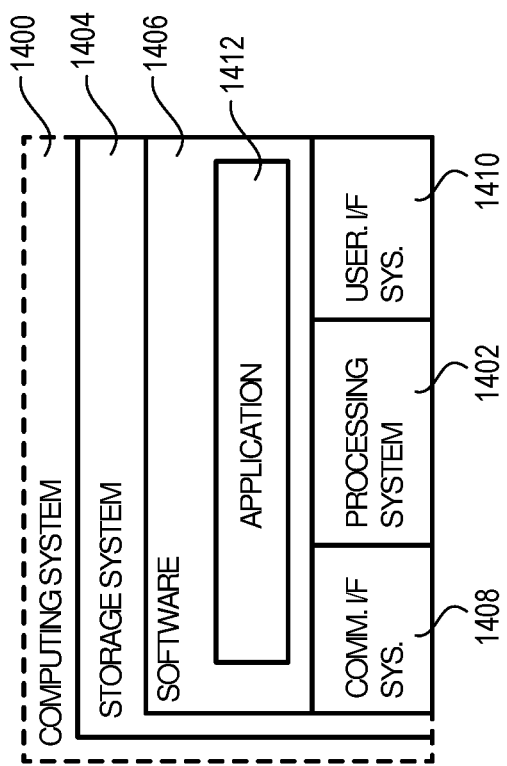
FIG. 14 illustrates a computing system suitable for implementing the software technology disclosed herein, including any of the applications, architectures, elements, processes, and operational scenarios and sequences illustrated in the Figures and discussed below in the Technical Disclosure.

Computing system 102 is representative of any computing system capable of running an application natively or in the context of a web browser, streaming an application, or executing an application in any other manner. Examples of computing system 102 include, but are not limited to, personal computers, mobile phones, tablet computers, desktop computers, laptop computers, wearable computing devices, or any other form factor, including any combination of computers or variations thereof. Computing system 102 may include various hardware and software elements in a supporting architecture suitable for providing application 104. One such representative architecture is illustrated in FIG. 14 with respect to computing system 1400.

Application 104 is representative of any software application capable of showing data in multiple tabular formats. Examples include, but are not limited to, spreadsheet applications, word processing applications, presentation applications, email applications, business management applications, note taking applications, and any other type of combination, variation, or combination thereof. Descriptions of reformatting data in one tabular format to a pivot table format in the context of a spreadsheet application are found herein, but any software application including those described above that include the ability to display tabular data and to convert it to another arrangement are contemplated herein. Application 104 may be implemented as a natively installed and executed application, a browser-based application, a streaming or streamed application, a mobile application, or in any other suitable manner.

Figure 2:
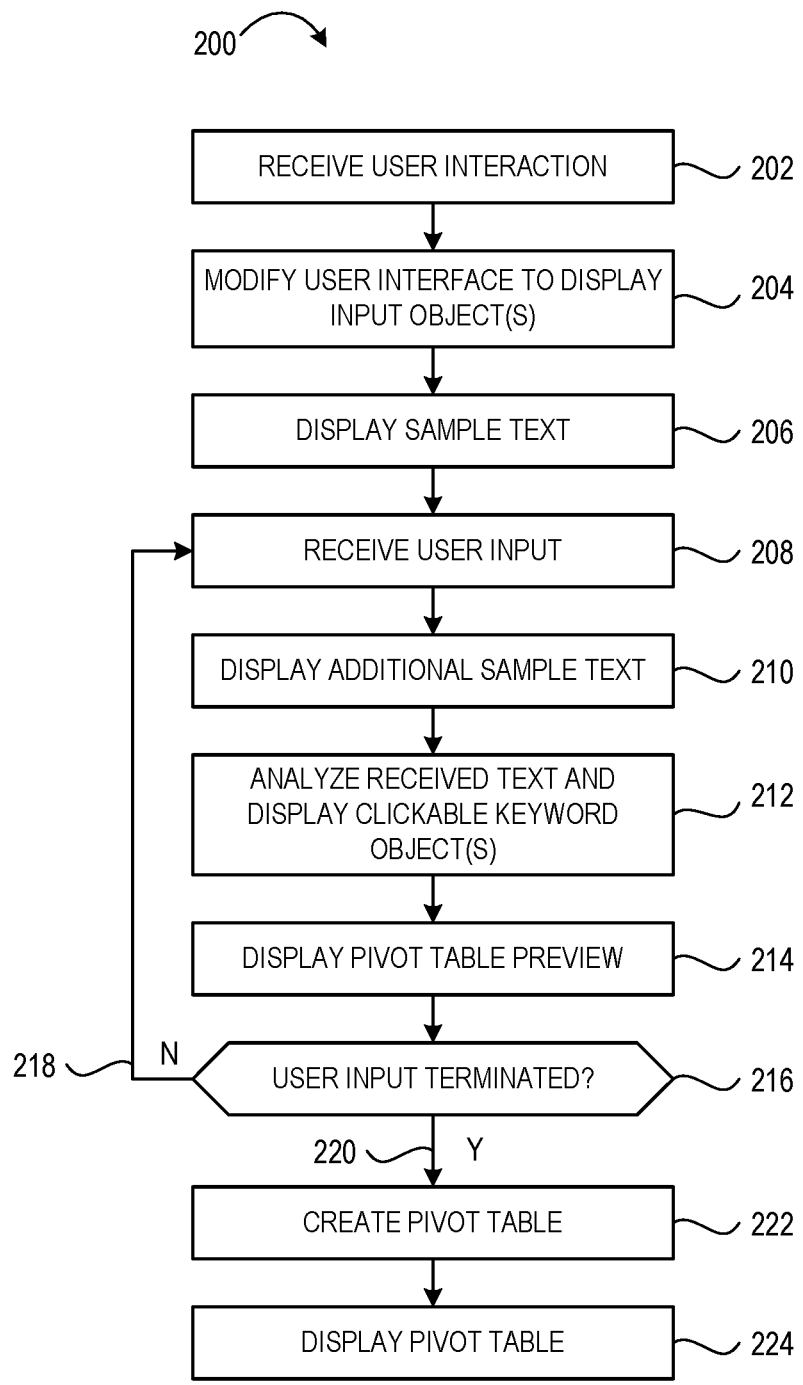
FIG. 2 illustrates a pivot table creation process in an implementation.

FIG. 2 illustrates a pivot table creation process 200 that may be employed by an application (e.g., application 104) to assist and guide a user to enter text, keywords, or other parameter information needed to create a pivot table from tabular data. Some or all of the steps of pivot table creation process 200 may be implemented in program instructions in the context of the component or components of the application used to carry out the pivot table creation and interaction operation on a main thread of the application. The program instructions direct a given application to operate as follows.

To begin, the application commences the pivot table creation process after receiving an input or user interaction from the user that the user wants to create a pivot table from tabular data (step 202). The user interaction may be, for example, a touch, mouse click, voice command, or other such interaction. After receiving the user interaction, the application modifies the user interface (step 204) to present at least one input object into which the user can enter or input text defining parameters of the desired pivot table. In addition, the application can display sample text and other objects in the at least one input object that are designed to assist and guide the user in determining the type of data that can be entered to define the pivot table. For example, the application may cause an input object to be displayed that allows the user to enter text via typing, pasting, or other ways of entering text. To help guide the user through the pivot table creation process, the application displays sample text (step 206) in the input object that provides an example to the user of the type of acceptable text entry that can be made.

User input is received (step 208) as text via the input object. During or after text entry into the input object, the application can generate and display additional sample text (step 210) in the same input object or in a different input object such as a list input object. The additional sample text can be generated based on the text already entered into the input object and may present one or more sample text phrases from which the user can choose. The one or more sample text phrases may be determined by the application based on the text already entered by the user and may include distinct phrases configured to offer alternative ways of adding to or completing the text in the input object. Selection of one of the sample text phrases via a user interaction through, for example, touch, mouse click, voice command, etc. causes the sample text phrase to be appended to the text entered into the input object.

The application can parse or otherwise analyze the entered text (step 212) to find pivot table keyword text including keywords specifying how the pivot table treats the appropriate data and including parameters specifying what data the pivot table is defined to act on. The keyword text found can be used to create clickable interactive parameter objects used as user inputs to display clickable lists containing substitutable related keywords or parameters. In an example, user-entered text identified as a column header can be used as the text of a clickable object in which the user can select to show a list of some or all of the column headers found in the data, allowing the user to quickly choose a substitute column header without needing to manually enter the information. The application can parse or analyze the entered text each time user input is received or based on a time delay during user input.

A preview of the pivot table may be displayed (step 214) at least after enough information has been entered by the user to generate a viable pivot table. As the user continues to enter or select additional pivot table parameters, the pivot table preview display may be updated based on the additional pivot table input data.

The application can determine if the user input is terminated (step 216), and while the user input is not terminated (218), the application continues to wait for and receive any additional user input from the user (step 208), to display additional sample text (step 210) based on the additional user input, and to locate keyword text to convert into clickable objects (step 212). In some implementations, user input is terminated based on receiving a user interaction configured to indicate termination. For example, the user may interact with a clickable object such as a button or menu option presented in the user interface that indicates to the user that interaction with such via a touch, mouse click, voice command, or other such interaction will cause the user entry phase to be terminated and the pivot table creation phase to begin. In other implementations, user input may be determined to be terminated based on a time delay where no text is input by the user, or by any other suitable manner. When the user input is terminated (220), the user-entry phase is complete, and the application can create a pivot table based on the user-centered text (step 222) and modify the user interface to display the created pivot table (step 224).

Referring back to FIG. 1, application 104 may employ pivot table creation process 200 when driving user interface 106. In a brief operational scenario, user interface 106 includes partial views 108, 110, 112 of a spreadsheet workbook hosted by application 104. The views 108-112 of the spreadsheet workbook includes cells 116 defined by rows and columns. In view 108, a formula bar 118 is configured to display cell values or formulas and to allow user-entry thereof. In this scenario, at least three columns of data have been initially entered in the cells 116 of view 108.

A user interaction occurring with respect to view 108 of user interface 106 triggers at least the display of a configuration bar 120 as illustrated in view 110 to allow the user to enter text for configuring and defining the creation of a pivot table. In some implementations, formula bar 118 is removed from user interface 106 while configuration bar 120 is being displayed. In other implementations, formula bar 118 may be hidden behind configuration bar 120. In other implementation, formula bar 118 and configuration bar 120 may be simultaneously displayed. User entry of text into configuration bar 120 is used to define at least some of the parameters for creating a pivot table from the data in the cells 116.

A user interaction occurring with respect to view 110 of user interface 106 triggers the creation and display of the pivot table in view 112 defined via the configuration bar 120 of view 110.

As illustrated in FIG. 1, an application renders a view on the user interface 106 of a spreadsheet application that includes formula bar 118. After receiving a user initialization input indicating that the user desires to configure a pivot table from data displayed on the user interface 106, the application transitions the view on the user interface 106 to include the configuration bar 120 through which the user can enter parameters to configure a pivot table. In this view, the formula bar 118 is hidden or not displayed on the user interface 106 when it is advantageous to hide the formula bar 118 due to a size of the display, such as on a mobile device. Upon completion of receiving configuration data for generating the pivot table, the application transitions the view on the user interface 106 to include the formula bar 118 previously hidden on the user interface 106.

FIGS. 3-12 illustrate an operational scenario 300 of pivot table creation process 200. A display device 302 capable of displaying and interacting with user interface 106 is illustrated. In some examples, display device 302 may be of any size and may include, for example, but are not limited to, desktop displays, laptop displays, tablet displays, mobile phone displays, television displays, wearable device displays, server computer displays, and any other type of computing system display suitable for carrying out the pivot table creation and interaction operations described herein.

In some implementations, display device 302 includes a touch-sensitive system designed to allow interaction with user interface 106 when a user's hand, touch-sensitive stylus, or other touch-sensitive device is positioned on, at, or near the touch-sensitive system. In this manner, text may be entered via a keyboard displayed on the display device 302, buttons and other clickable objects may be interacted with via proximity of touch-sensitive devices, and other ways of interacting with objects displayed in the user interface 106 via touch input known in the art are possible and contemplated herein. In other implementations, a user-controlled object such as a mouse icon is controllable by the user for interacting with objects displayed in the user interface 106. A physical keyboard may also provide input to the user interface 106. Other forms of user interaction with user interface 106 known in the art for interacting with user interface 106 are also contemplated herein.

An application executing a spreadsheet program may display on the display device 302 a workbook 304 that includes one or more spreadsheets 306 with cells 308 defined by rows and columns. One or more menu commands 310 may be presented in the user interface 106 for performing complex tasks or for performing frequently-used tasks, for example.

In the operational scenario 300 illustrated, a plurality of data is displayed in the spreadsheet 306 in a tabular format. The data may be ungrouped or may be grouped together to form an object such as a table object. When grouped as a table object, the application may form column headers 312 for each column, and each column header 312 may have a respective button 314 that, when clicked, provides a menu of one or more selectable operations to perform on the column data.

A formula bar 316 presented in the user interface 106 allows the user to interact with the data in one or more cells 308. For example, insertion, modification, or deletion of text in the formula bar 316 may cause the value in one or more selected cells to be correspondingly modified. As illustrated, the text in selected cell B3 matches the text presented in formula bar 316. Modifying a text value in the formula bar 316 followed by application of a proper commit or apply command typically causes the text value in the selected cell to change to the text value modified in the formula bar 316. Modifying a formula in the formula bar 316 followed by application of the proper commit or apply command may cause the value in the selected cell to change depending on the result of the modified formula.

Figure 3:
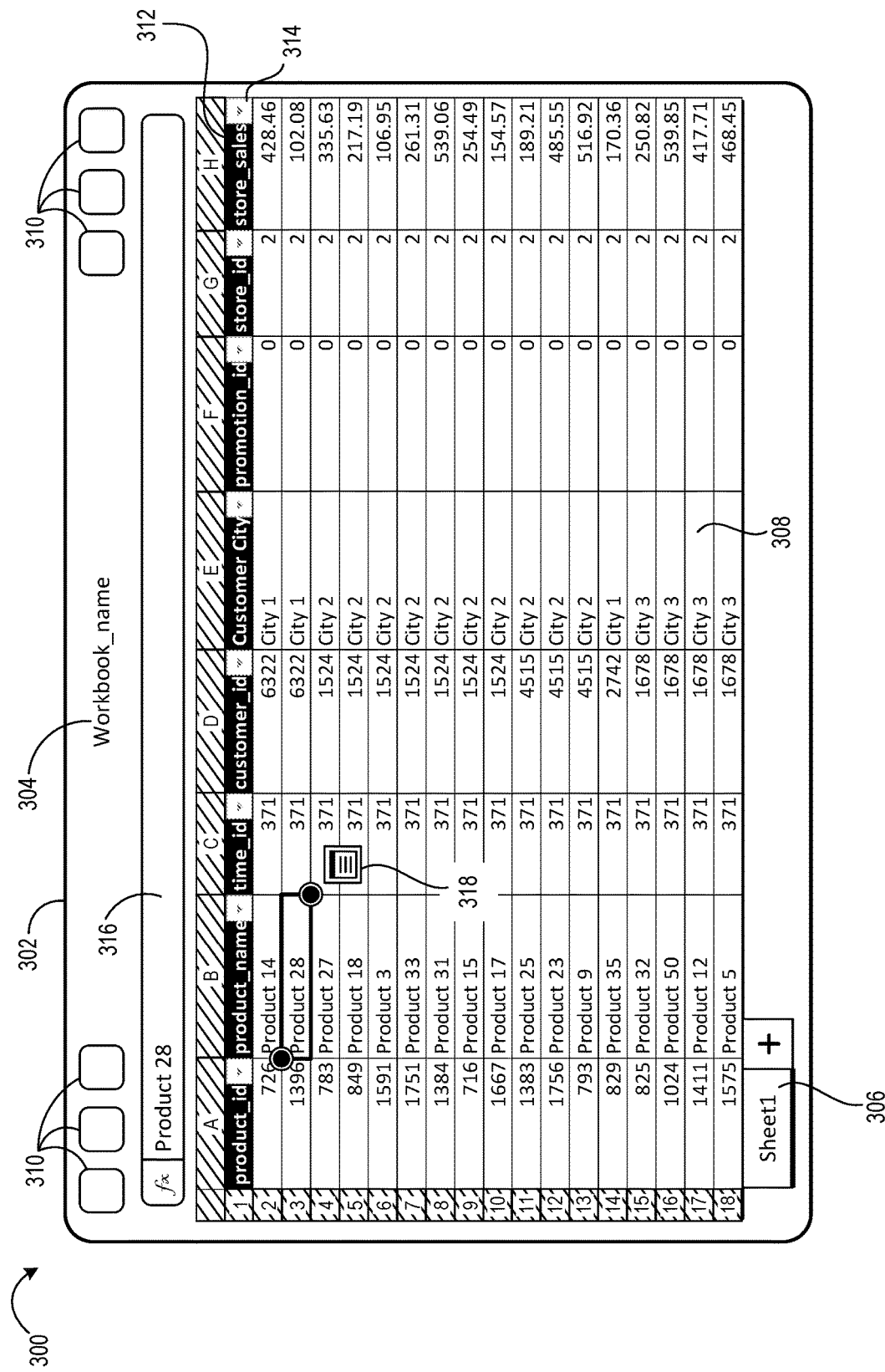
FIGS. 3-12 illustrate creation of a pivot table in an operational scenario.

As illustrated in FIG. 3, selection of cell B3 is discernible by a distinctive border surrounding the cell and further by a pair of user-interactive circles positioned near opposite corners of the distinctive border. In this operational scenario where the application is configured to provide the pivot table creation process 200 described herein to the user when the user wants to create a pivot table, a clickable object such as an icon 318 may be displayed in the user interface 106 to allow the user to begin the process. Alternatively, or in addition to, a new or additional menu command 310 may be displayed near the other menu commands 310 to allow the user to begin the process. In some implementations, the application may display the icon 318 or additional menu command 310 whenever any cell 308 is selected having a value. In this manner, the application may associate the data of the selected cell together with its grouped or continuous neighbors as the data upon which to apply the pivot table creation process. A user interaction with the icon 318 or additional menu command 310 satisfies step 202 of the pivot table creation process 200, and the application executes the remainder of the pivot table creation process 200.

Figure 4:
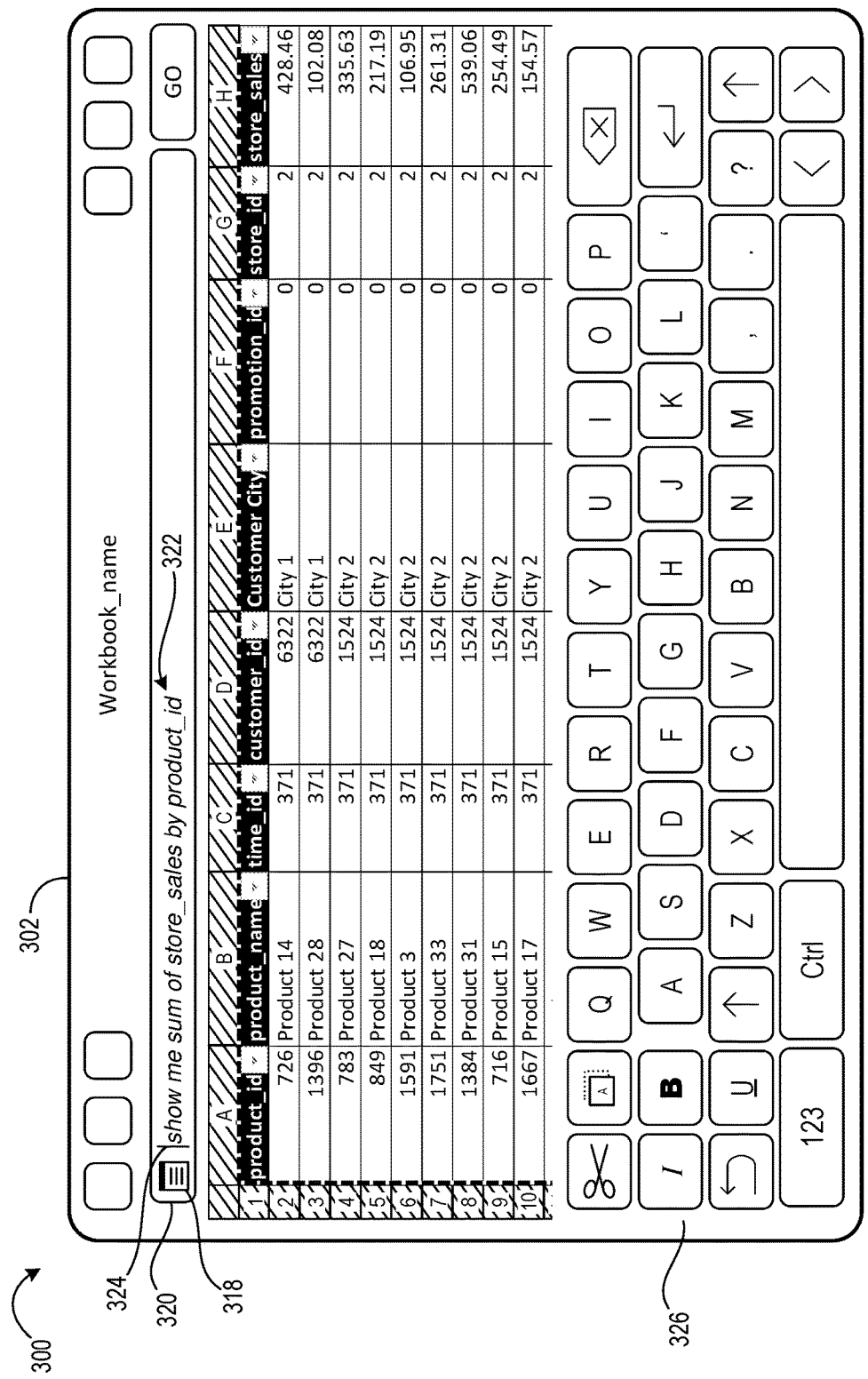

Execution of steps 204 and 206 are illustrated in FIG. 4 where a horizontal configuration bar 320 for configuring a pivot table is displayed and where an initial example text phrase 322 is displayed therein. In some implementations, configuration bar 320 is displayed at or near the position where the formula bar 316 is typically displayed while the formula bar 316 is removed or hidden from the user interface 106. To help the user distinguish between the formula bar 316 and the configuration bar 320, icon 318 may be reproduced and displayed near the configuration bar 320, such as at the beginning thereof.

The initial example text phrase 322 displayed in the configuration bar 320 when the pivot table creation process 200 is initiated may be selected from a pre-programmed or pre-determined text phrase in some implementations. In other implementations, the initial example text phrase 322 may be selected from a user's frequently-used text phrases or from the user's last-used text phrase. The initial example text phrase 322 provides an example to the user of the type of text input and phrasing useful for producing a pivot table via the pivot table creation process 200. In the implementation shown, the initial example text phrase 322 is displayed in a text format distinct from the text format used for displaying the user's actual entered text. For example, the initial example text phrase 322 illustrated in FIG. 4 is shown in an italicized format. Alternatively or in addition thereto, the initial example text phrase 322 may be shown in a distinct color (e.g., grayed out) from the text entered by the user. A cursor 324 displayed in the configuration bar 320 identifies to the user where the inputted text will begin to be displayed.

Further illustrated in FIG. 4 is a virtual keyboard 326 with which the user may interact in order to enter text into the configuration bar 320. However, as described above, other forms of user interaction with user interface 106 such as via a physical keyboard may be used instead to enter text into the configuration bar 320.

Figure 5:
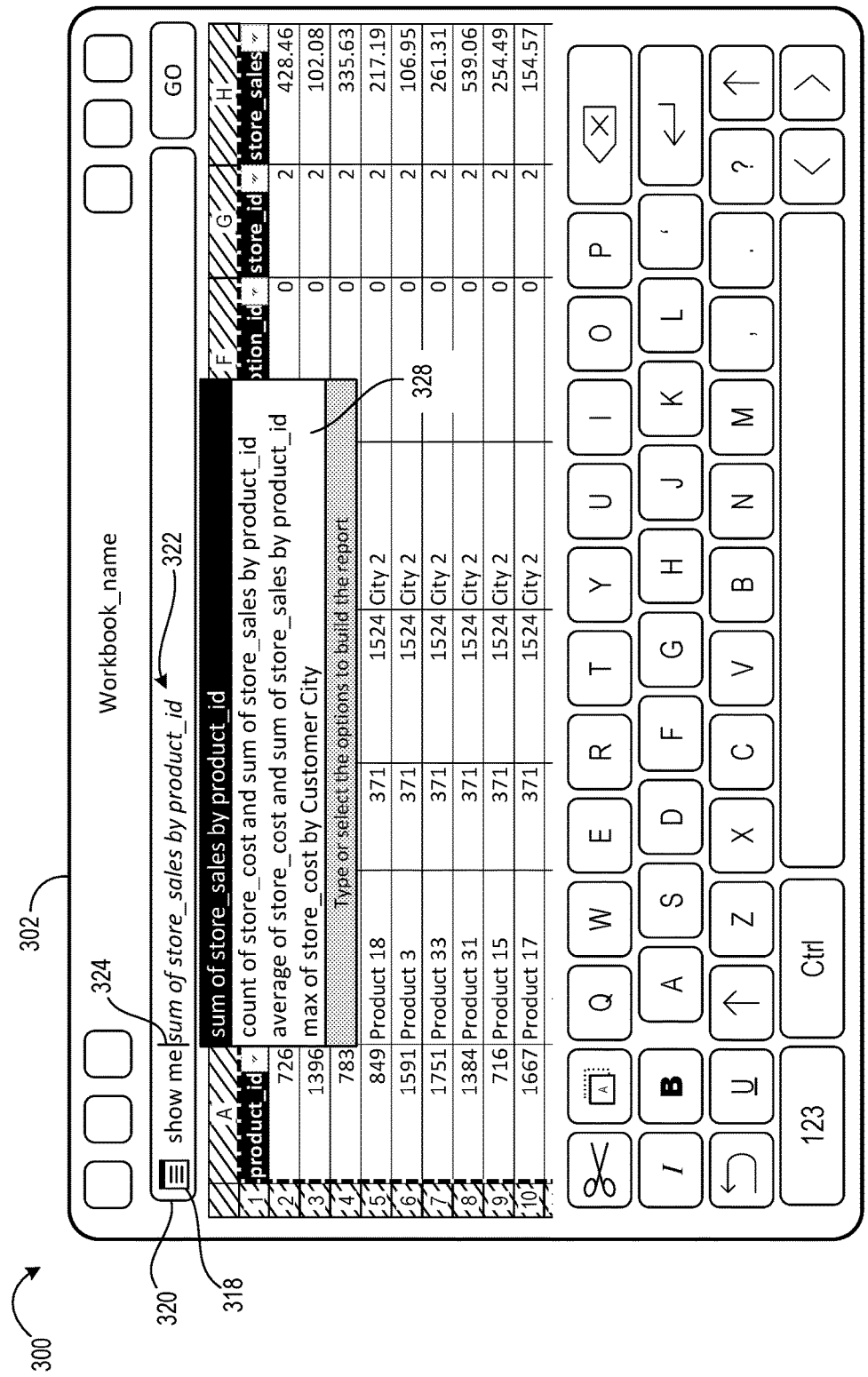

Execution of steps 208 and 210 are illustrated in FIG. 5. A user input including the phrase "show me" is entered into the configuration bar 320. The user-entered phrase "show me" is displayed in a non-italicized format as the user types the phrase. Since the user-entered phrase "show me" matches the first two words in the example text phrase 322, the remainder of the text in the example text phrase 322 remains displayed in the italicized format.

In some implementations, the configuration bar 320 able to show a single line of text either entered by the user or provided as an example by the application. While the user is entering text into the configuration bar 320, the application may provide an additional input object, such as a list input object 328, into which one or more example text phrases may be displayed for selection by the user. When the user selects any one of the example text phrases in the list input object 328, the example text phrase is appended to the text already entered in the configuration bar 320. The list input object 328 is displayed, in some implementations, near the cursor 324 but underneath the configuration bar 320 so that display of the configuration bar 320 is not blocked.

Figure 6:
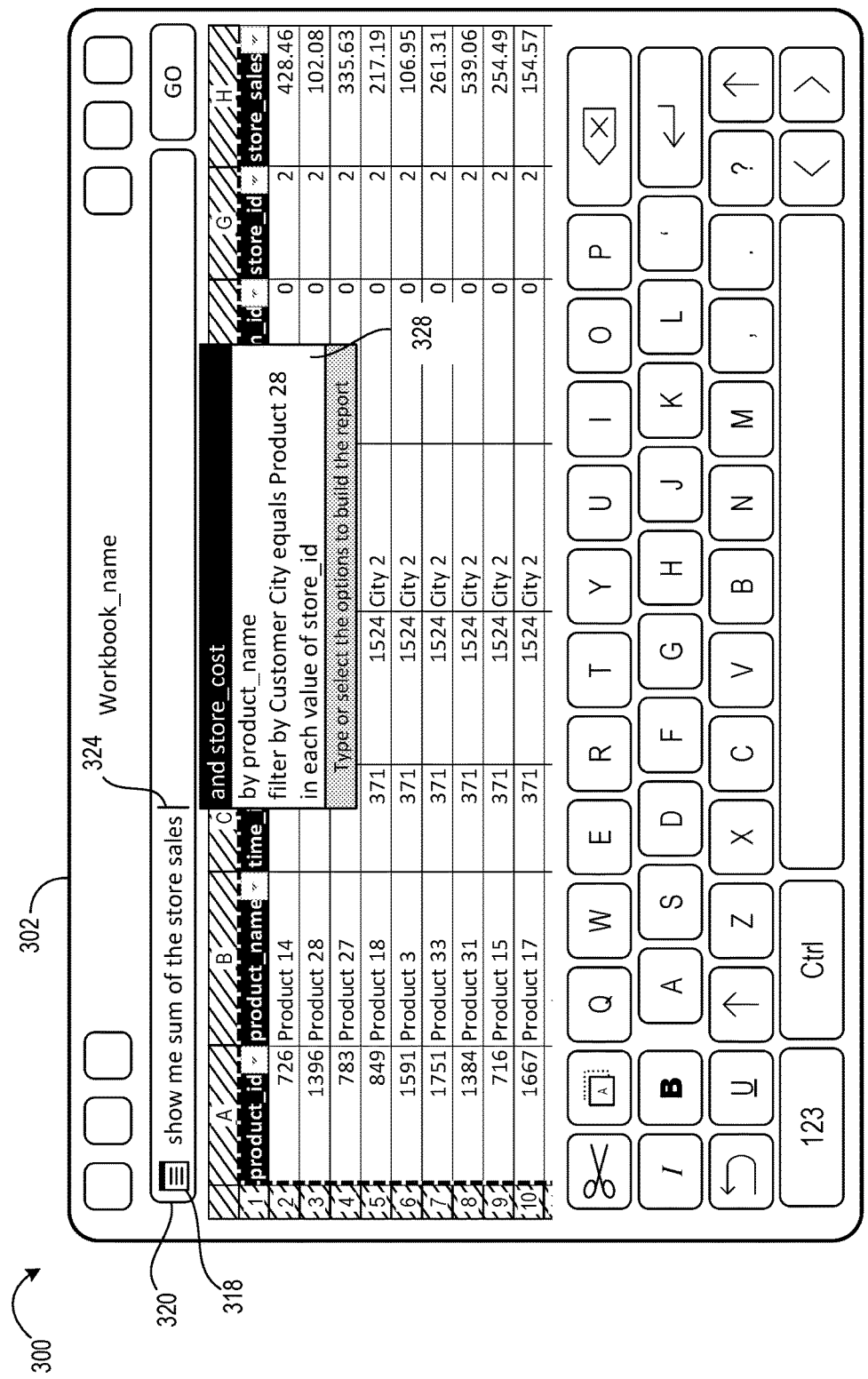

FIG. 6 illustrates additional text entry entered by the user not matching any of the provided example phrases in the list input object 328. The text entered by the user can be entered as natural language or can be entered according to specific keywords and text patterns. When entered as natural language, the application is able to match parts of the input text to parameters needed to create the pivot table from the data. For example, the program is able to match the column header "store_sales" to the entered natural text "store sales". In this manner, the user more comfortable with entering natural language text may still use and take advantage of the pivot table creation process 200. Since the user typed text deviating from the sample text first offered (i.e., "show me the sum of store_sales by product_id"), the sample text is removed from the configuration bar 320 following the position of the cursor 324. In addition, the application may substitute any or all of the example text phrases in the list input object 328 with new or updated example text phrases based on the text entered by the user. One of the example text phrases (e.g., "by product_name") may be selected or clicked by the user in the list input object 328 or the matching text may be manually or otherwise typed into the configuration bar 320, resulting in the change to the user interface 106 as illustrated in FIG. 7.

Figure 7:
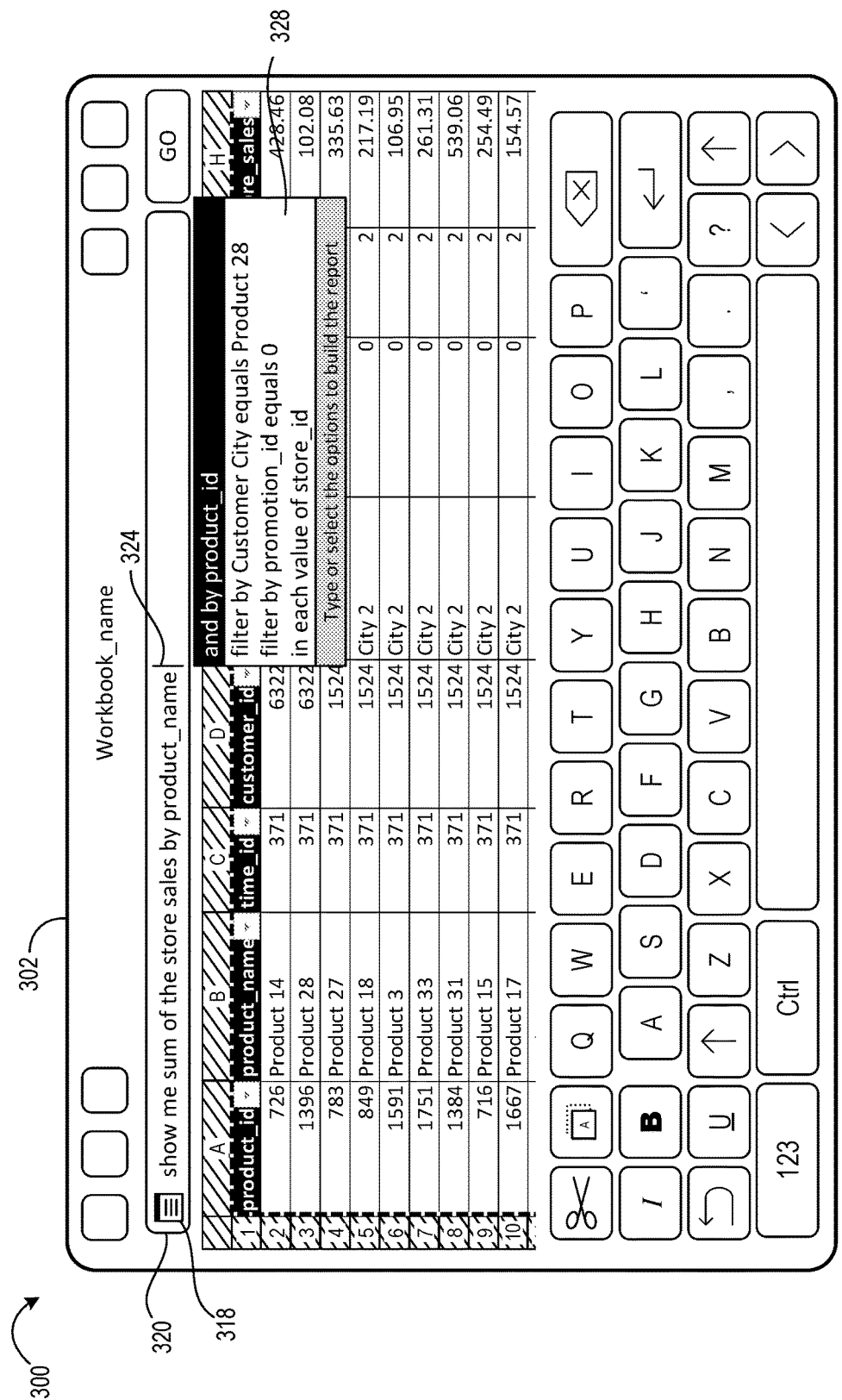

FIG. 7 illustrates a substitution of some of the example text phrases in the list input object 328 with new or updated example text phrases based on the "by product_name" text entered by the user. Selection or manual entry by the user of the phrase "filter by promotion_id equals 0" completes the text entered into the configuration bar 320 in this operational scenario 300, and the user input is terminated.

Figure 8:
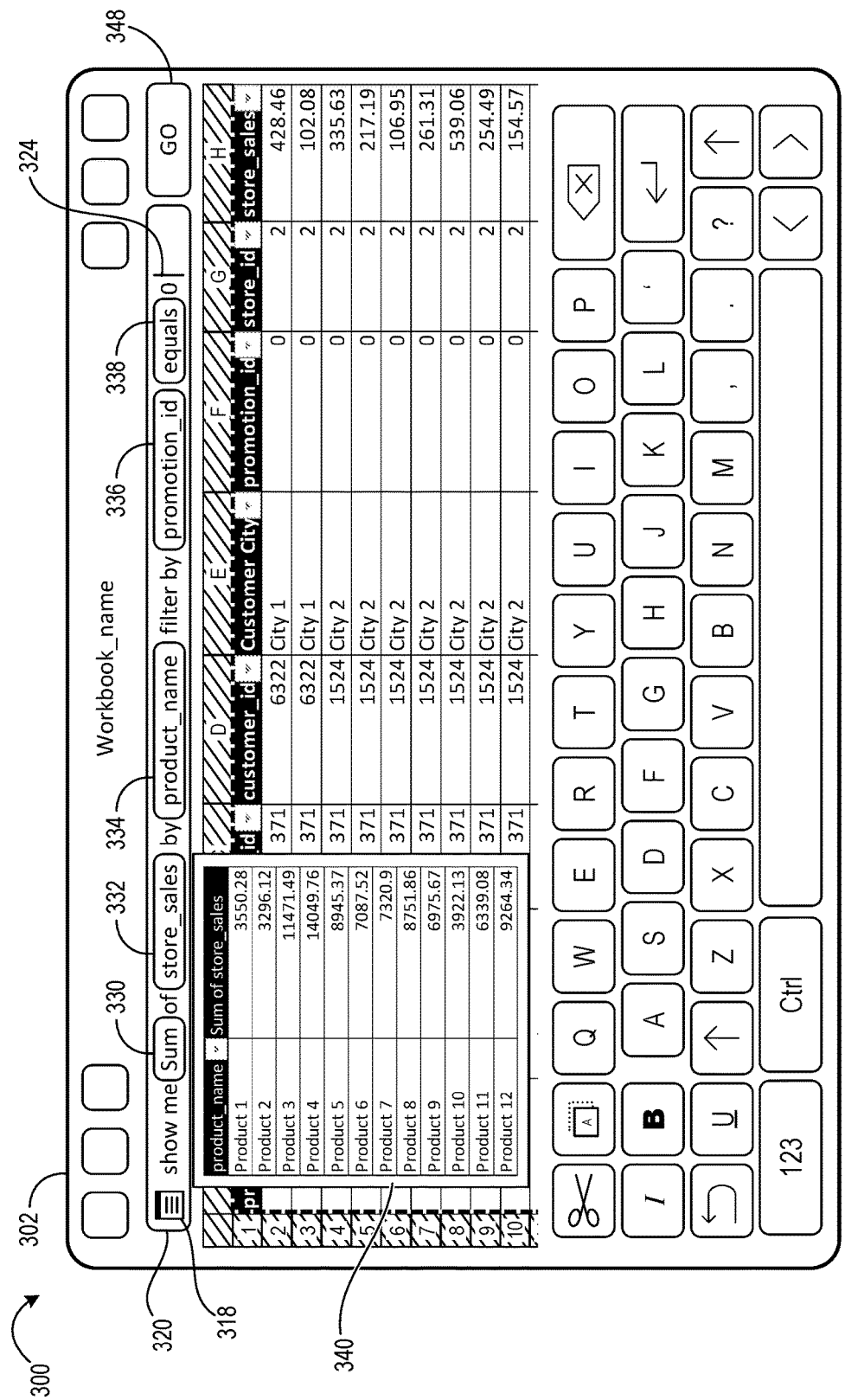

As illustrated in FIG. 8, the application, via parsing or other analysis of the entered text during execution of step 212, may identify, create, and display clickable interactive parameter objects 330-338 of the keyword text in the configuration bar 320. The value of each clickable interactive parameter object 330-338 is set to the respective identified text. In some implementations, display of the clickable interactive parameter objects 330-338 replaces the respective identified text in the configuration bar 320. In some implementations, the original identified text may still exist in the configuration bar 320 but may be hidden due to the display of the clickable interactive parameter objects 330-338 occurring on a graphic layer in front of the text of the configuration bar 320. Still referring to FIG. 8, the application can further create and display a preview 340 of the pivot table (step 214) that would be created based on the entered text.

Figure 9:
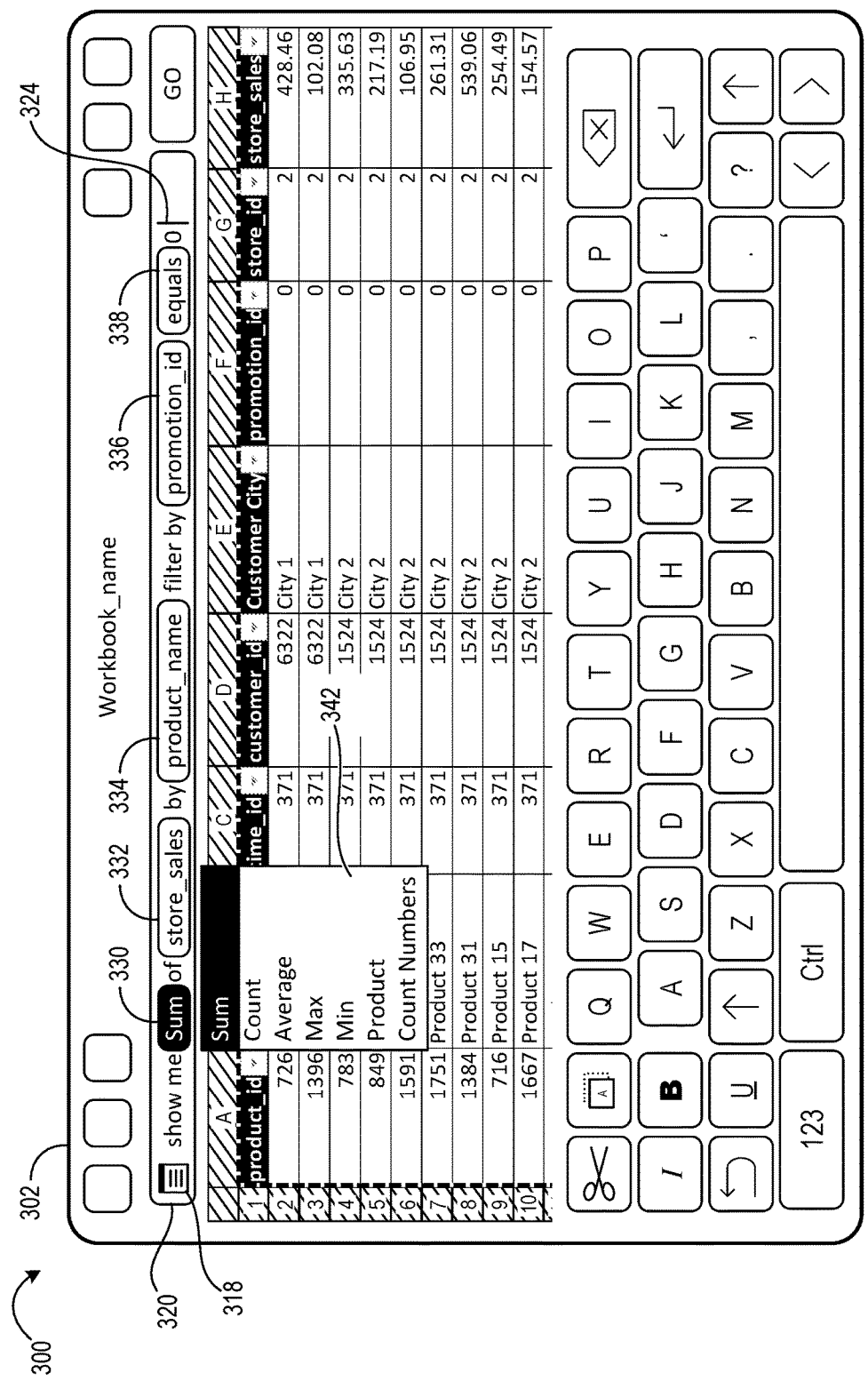
Figure 10:
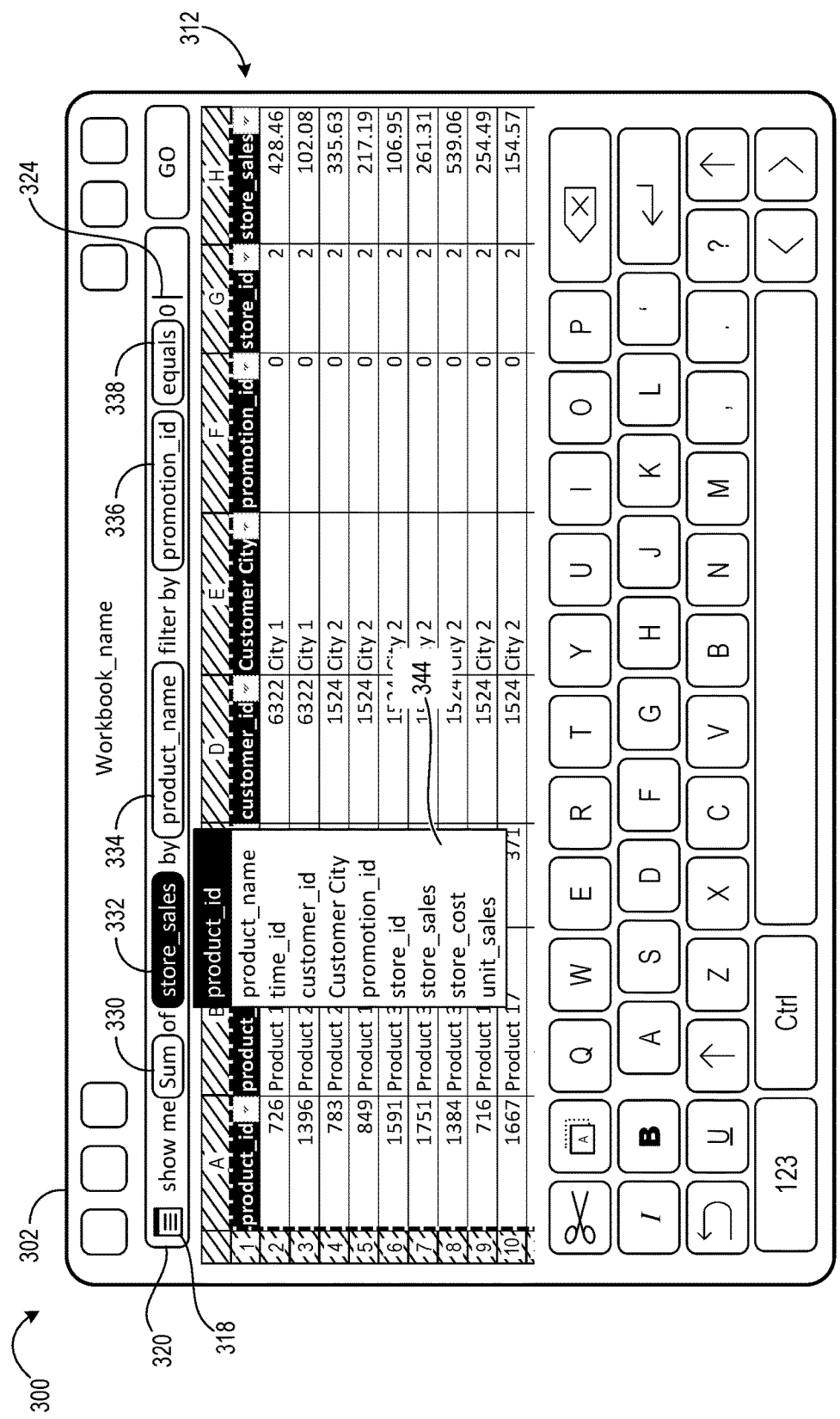
Figure 11:
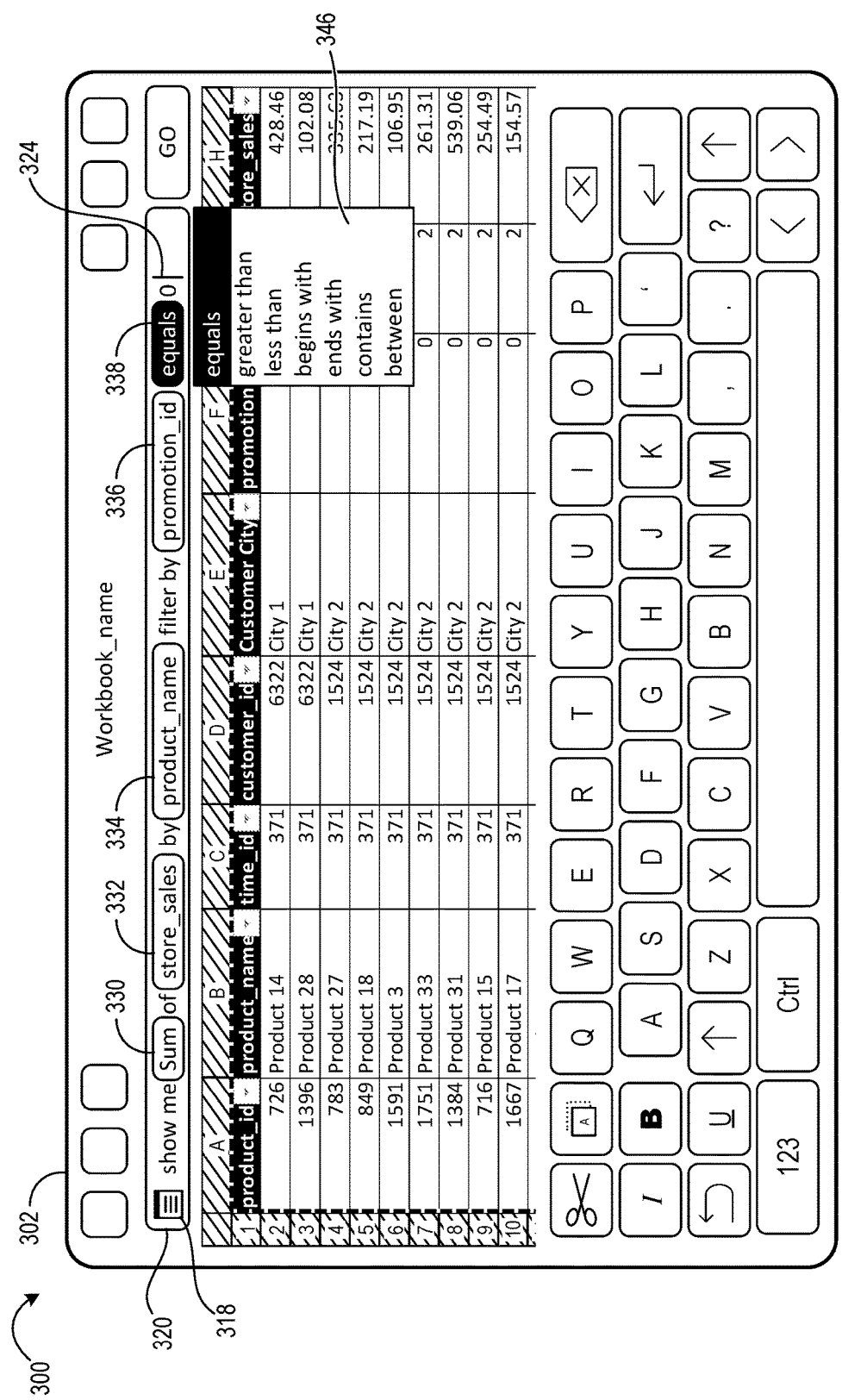

FIGS. 9-11 illustrate examples of clickable lists 342, 344, 346 created and displayed when respective clickable interactive parameter objects 330, 332, 336 are clicked or otherwise interacted with by the user. As shown in FIG. 9, the "Sum" keyword may be related to other operational keywords specifying how the pivot table treats the appropriate data. Examples of performing an operation on the data include summing, counting, averaging, finding a maximum or a minimum, multiplying, or counting numbers. However, other related or similar type operations may also be displayed. Clickable list 344 in FIG. 10 includes the column headers 312 available in the data on spreadsheet 306. While the column header "store_sales" was initially entered into the configuration bar 320, the user may decide that a different column of data should be summed, for example, instead of the data in "store_sales". Choosing the text of a different column header in clickable list 344 substitutes the text in clickable interactive parameter object 332 accordingly. In FIG. 11, the options shown in clickable list 346 offer substitute filter operations to be formed on the data.

Figure 12:
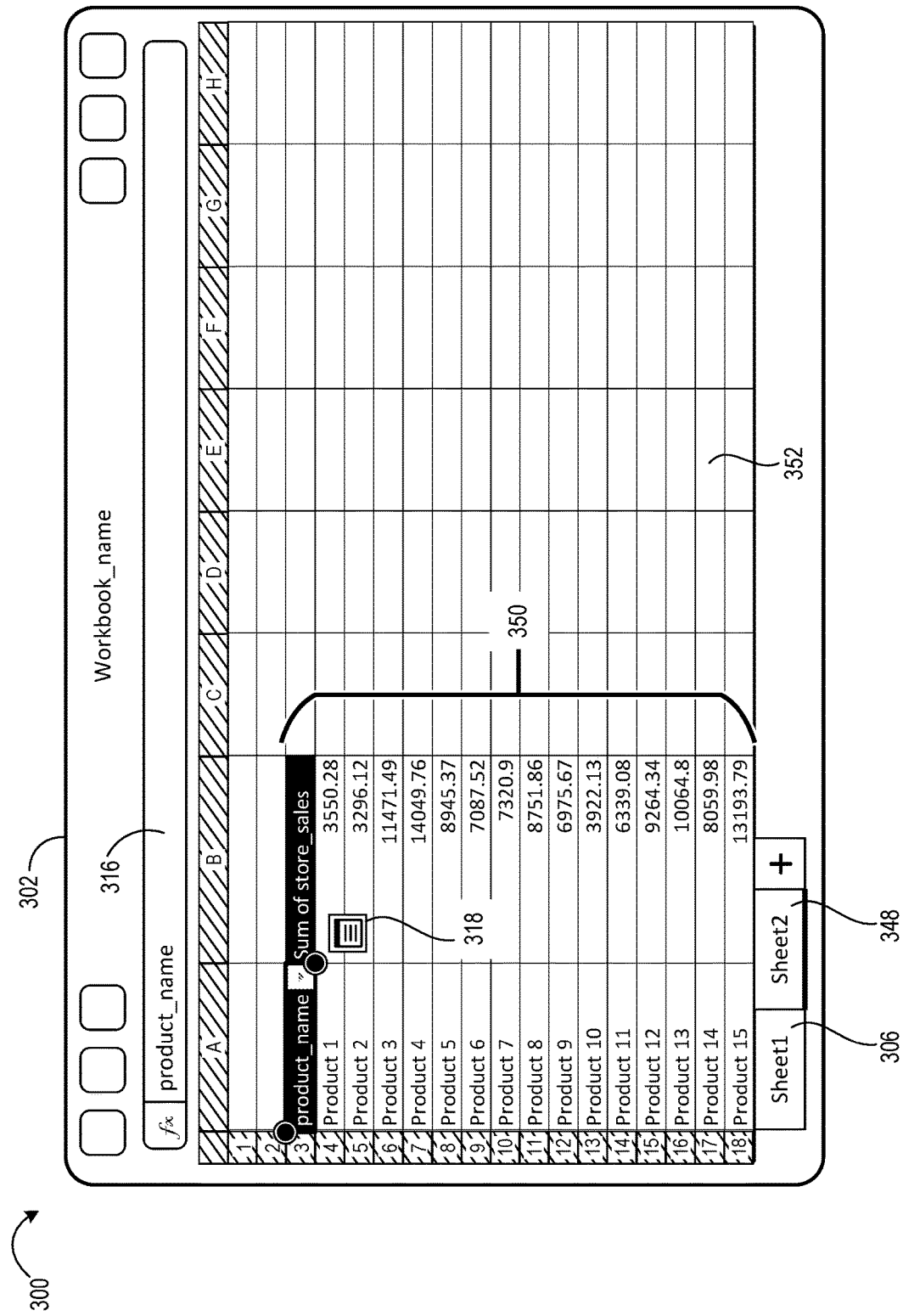
Figure 13:
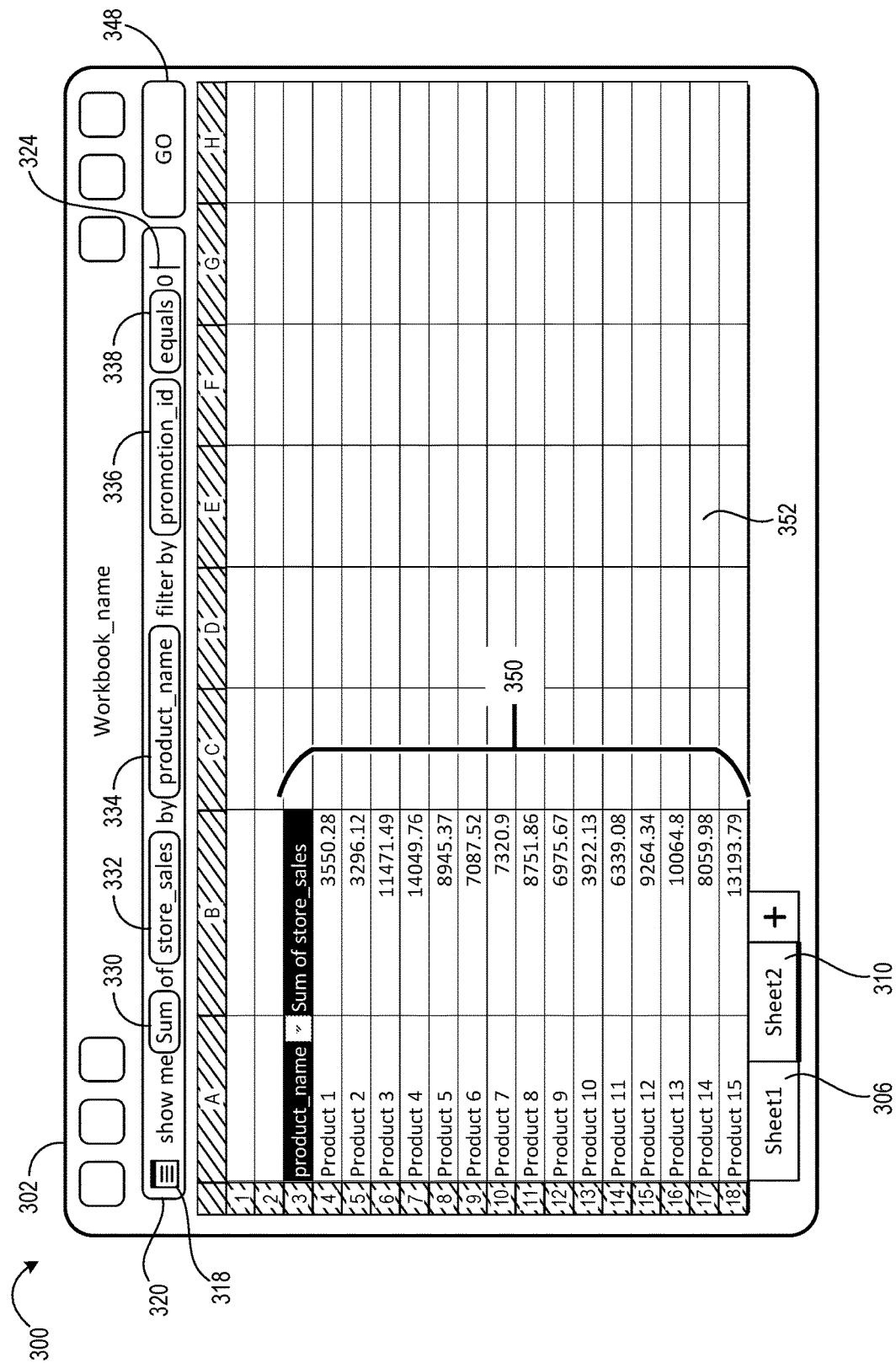
FIG. 13 illustrates interaction with a pivot table in an operational scenario.

Referring back to FIG. 8, a clickable termination object 348 is displayed adjacently to configuration bar 320 that allows the user to manually end the user-entry phase of pivot table creation process 200. The application then creates a pivot table 350 based on the text entered during the user-entry phase and displays the created pivot table in cells 352 of a new spreadsheet 354 in some implementations as illustrated in FIG. 12. In another implementation, the created pivot table may be displayed in a new area of cells 308 of spreadsheet 306.

In addition, FIG. 12 illustrates that the configuration bar 320 is removed from the user interface 106 and that the formula bar 316 is once again displayed. Also, icon 318 may be displayed adjacently to a selected cell 356 when the cell selected falls within the cells occupied by pivot table 350. Selection of icon 318 based on a selected cell 356 of pivot table 350 hides formula bar 316 and displays configuration bar 320 filled in with the text and clickable interactive parameter objects 330-338 applicable to the parameters of pivot table 350. Modifications to the text of configuration bar 320 or to any of the clickable objects 330-338 followed by user-interaction with termination object 348 may cause pivot table 350 to be updated accordingly. In addition, user-interaction with termination object 348 also causes user interface 106 to remove configuration bar 320 from the display and to show formula bar 316.

FIG. 14 illustrates a computing system 1400, which is representative of any system or collection of systems in which the various applications, services, scenarios, and processes disclosed herein may be implemented. Examples of computing system 1400 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the pivot table creation and interaction operations described herein. Such systems may employ one or more virtual machines, containers, or any other type of virtual computing resource in the context of pivot table creation and interaction.

Computing system 1400 may be implemented as a single apparatus, system, or device or may be implemented in a distributed manner as multiple apparatuses, systems, or devices. Computing system 1400 includes, but is not limited to, processing system 1402, storage system 1404, software 1406, communication interface system 1408, and user interface system 1410. Processing system 1402 is operatively coupled with storage system 1404, communication interface system 1408, and user interface system 1410.

Processing system 1402 loads and executes software 1406 from storage system 1404. Software 1406 includes application 1412, which is representative of the software applications discussed with respect to the preceding FIGS. 1-13, including application 104. When executed by processing system 1402 to enable pivot table creation and interaction, application 1412 directs processing system 1402 to operate as described herein for at least the various processes, operational scenarios, and sequences discussed in the foregoing implementations. Computing system 1400 may optionally include additional devices, features, or functionality not discussed for purposes of brevity.

Referring still to FIG. 14, processing system 1402 may comprise a micro-processor and other circuitry that retrieves and executes software 1406 from storage system 1404. Processing system 1402 may be implemented within a single processing device, but may also be distributed across multiple processing devices or sub-systems that cooperate in executing program instructions. Examples of processing system 1402 include general purpose central processing units, application specific processors, and logic devices, as well as any other type of processing device, combinations, or variations thereof.

Storage system 1404 may comprise any computer readable storage media readable by processing system 1402 and capable of storing software 1406. Storage system 1404 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 1404 may also include computer readable communication media over which at least some of software 1406 may be communicated internally or externally. Storage system 1404 may be implemented as a single storage device, but may also be implemented across multiple storage devices or sub-systems co-located or distributed relative to each other. Storage system 1404 may comprise additional elements, such as a controller, capable of communicating with processing system 1402 or possibly other systems.

Software 1406 in general, and application 1412 in particular, may be implemented in program instructions and among other functions may, when executed by processing system 1402, direct processing system 1402 to operate as described with respect to the various operational scenarios, sequences, and processes illustrated herein. For example, application 1412 may include program instructions for implementing pivot table creation process, such as pivot table creation process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. Software 1406 may include additional processes, programs, or components, such as operating system software, virtual machine software, or other application software, in addition to or that include application 1412. Software 1406 may also comprise firmware or some other form of machine-readable processing instructions executable by processing system 1402.

In general, application 1412 may, when loaded into processing system 1402 and executed, transform a suitable apparatus, system, or device (of which computing system 1400 is representative) overall from a general-purpose computing system into a special-purpose computing system customized to facilitate pivot table creation and interaction. Indeed, encoding application 1412 on storage system 1404 may transform the physical structure of storage system 1404. The specific transformation of the physical structure may depend on various factors in different implementations of this description. Examples of such factors may include, but are not limited to, the technology used to implement the storage media of storage system 1404 and whether the computer-storage media are characterized as primary or secondary storage, as well as other factors.

For example, if the computer readable storage media are implemented as semiconductor-based memory, application 1412 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1408 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1410 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1410. In some cases, the input and output devices may be combined in a single device, such as a display capable of displaying images and receiving touch gestures. The aforementioned user input and output devices are well known in the art and need not be discussed at length here.

User interface system 1410 may also include associated user interface software executable by processing system 1402 in support of the various user input and output devices discussed above. Separately or in conjunction with each other and other hardware and software elements, the user interface software and user interface devices may support a graphical user interface, a natural user interface, or any other type of user interface, in which a user interface to an application may be presented (e.g., user interface 106).

Communication between computing system 1400 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Certain inventive aspects may be appreciated from the foregoing disclosure, of which the following are various examples.

Example 1

A computing apparatus comprising: one or more computer readable storage media; a processing system operatively coupled with the one or more computer readable storage media; and program instructions stored on the one or more computer readable storage media for creating a pivot table that, when executed by the processing system, direct the processing system to at least: render a view in a user interface to a spreadsheet application, the view comprising a formula bar; in response to receiving a user initialization input, render the view to hide the formula bar and display a configuration bar configured to receive at least one pivot table parameter; generate a pivot table based on the at least one pivot table parameter; and render the view to display the formula bar after generation of the pivot table.

Example 2

The computing apparatus of Example 1 wherein the program instructions further direct the processing system to: receive a user configuration input via the configuration bar defining the at least one pivot table parameter; identify an interactive parameter object based on the identified at least one pivot table parameter; display the interactive parameter object adjacently to a portion of the configuration bar; receive a parameter user interaction with the interactive parameter object; in response to receiving the parameter user interaction, display at least one additional pivot table parameter related to the at least one pivot table parameter; generate the pivot table based on the user configuration input and based on a value of the interactive parameter object.

Example 3

The computing apparatus of Examples 1-2 wherein the program instructions further direct the processing system to: display the at least one additional pivot table parameter in a list display object; receive a list user interaction with the list display object, wherein the list user interaction selects the at least one additional pivot table parameter; and set the value of the interactive parameter object based on the selected at least one additional pivot table parameter.

Example 4

The computing apparatus of Examples 1-3 wherein the program instructions further direct the processing system to display the at least one pivot table parameter in the list display object.

Example 5

The computing apparatus of Examples 1-4 wherein, to receive a user configuration input defining at least one pivot table parameter, the program instructions direct the processing system to receive text in the configuration bar.

Example 6

The computing apparatus of Examples 1-5 wherein, to display the interactive parameter object adjacently to a portion of the configuration bar, the program instructions direct the processing system to replace the at least one pivot table parameter with the interactive parameter object.

Example 7

The computing apparatus of Examples 1-6 wherein the program instructions further direct the processing system to display sample text illustrating an example of acceptable text receivable as the user input.

Example 8

The computing apparatus of Examples 1-7 wherein the program instructions further direct the processing system to: receive a subsequent user configuration input defining a subsequent pivot table parameter; create a preview of the pivot table based on the at least one pivot table parameter and based on the subsequent pivot table parameter; and display the preview.

Example 9

A method for creating a pivot table comprising: receiving a user input defining at least one pivot table parameter; creating an interactive parameter object based on the at least one pivot table parameter; displaying the interactive parameter object adjacently to a portion of the user input; receiving a parameter user interaction with the interactive parameter object; in response to receiving the parameter user interaction, displaying at least one additional pivot table parameter related to the at least one pivot table parameter; creating the pivot table based on the user input and based on a value of the interactive parameter object.

Example 10

The method of Example 9 further comprising: displaying the at least one additional pivot table parameter in a list display object; receiving a list user interaction with the list display object, wherein the list user interaction selects the at least one additional pivot table parameter; and setting the value of the interactive parameter object based on the selected at least one additional pivot table parameter.

Example 11

The method of Examples 9-10 further comprising displaying the at least one pivot table parameter in the list display object.

Example 12

The method of Examples 9-11 wherein receiving a user input defining at least one pivot table parameter comprises receiving text in a configuration bar.

Example 13

The method of Examples 9-12 wherein displaying the interactive parameter object adjacently to a portion of the user input comprises replacing the at least one pivot table parameter with the interactive parameter object.

Example 14

The method of Examples 9-13 further comprising displaying sample text illustrating an example of acceptable text receivable as the user input.

Example 15

The method of Examples 9-14 further comprising: receiving a subsequent user input defining a subsequent pivot table parameter; creating a preview of the pivot table based on the at least one pivot table parameter and based on the subsequent pivot table parameter; and displaying the preview.

Example 16

One or more computer readable storage media having program instructions stored thereon for creating a pivot table, wherein the program instructions, when executed by a processing system, direct the processing system to at least: receive a user input defining a plurality of pivot table parameters; create an interactive parameter object for each identified pivot table parameter; display the interactive parameter objects adjacently to the user input; display an additional pivot table parameter related one of the plurality of pivot table parameters in response to receiving a user interaction with one of the interactive parameter objects associated with the one of the plurality of pivot table parameters; and create the pivot table based on the user input and based on values of the interactive parameter objects.

Example 17

The one or more computer readable storage media of Example 16 wherein the program instructions further direct the processing system to: display the plurality of pivot table parameters in a list display object; receive a list user interaction with the list display object, wherein the list user interaction selects the additional pivot table parameter; and set the value of the interactive parameter object based on the selected additional pivot table parameter.

Example 18

The one or more computer readable storage media of Examples 16-17 wherein, to receive a user input defining plurality of pivot table parameters, the program instructions direct the processing system to receive text in a configuration bar; and wherein, to display the interactive parameter objects adjacently to a portion of the user input, the program instructions direct the processing system to replace text entries of the plurality of pivot table parameters with the interactive parameter objects.

Example 19

The one or more computer readable storage media of Examples 16-18 wherein the program instructions further direct the processing system to display sample text illustrating an example of acceptable text receivable as the user input.

Example 20

The one or more computer readable storage media of Examples 16-19 wherein the program instructions further direct the processing system to: create a preview of the pivot table based on the plurality of pivot table parameters; and display the preview.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for creating a pivot table comprising:
   rendering a view in a user interface to a spreadsheet application, the view comprising a formula bar for editing content of cells in a spreadsheet;
   in response to a user interaction, replacing the formula bar with a configuration bar;

receiving, via the configuration bar, a user input defining at least one pivot table parameter of the pivot table;

based on the at least one pivot table parameter, creating an interactive parameter object;

displaying the interactive parameter object adjacently to a portion of the user input in the configuration bar; and in response to receiving a parameter user interaction with the interactive parameter object;

displaying in a list display object at least one additional pivot table parameter of the pivot table related to the at least one pivot table parameters;

receiving a list user interaction with the list display object, wherein the list user interaction selects the at least one additional pivot table parameter; and setting a value of the interactive parameter object based on the selected at least one additional pivot table parameter; and generating the pivot table based on at least the value of the interactive parameter object.

2. The method of claim 1 wherein receiving the user input defining the at least one pivot table parameter comprises receiving a selection of at least one of a row and a column that includes a string of text, and wherein the pivot table parameter comprises the string of text.

3. The method of claim 1 wherein the configuration bar is displayed in a space formerly occupied by the formula bar.

4. The method of claim 1 wherein enabling display of the interactive parameter object adjacently to a portion of the user input comprises replacing the at least one pivot table parameter with the interactive parameter object.

5. The method of claim 1 further comprising enabling display of sample text illustrating example key words used to identify the at least one pivot table parameter and an operation to perform with respect to the at least one pivot table parameter, and creating the pivot table based on the at least one pivot table parameter and the operation.

6. The method of claim 1 further comprising:
receiving a subsequent user input defining a subsequent pivot table parameter;
identifying the subsequent pivot table parameter;
creating a preview of the pivot table based on the at least one pivot table parameter and based on the subsequent pivot table parameter; and
enabling display of the preview.

7. One or more computer readable storage media having program instructions stored thereon for creating a pivot table, wherein the program instructions, when executed by a processing system, direct the processing system to at least:
render a view in a user interface to a spreadsheet application, the view comprising a formula bar for editing content of cells in a spreadsheet;
in response to a user interaction, replace the formula bar, with a configuration bar;
receive, via the configuration bar, a user input defining at least one pivot table parameter of the pivot table;
based on the at least one pivot table parameter, create an interactive parameter object;
display the interactive parameter object adjacently to the user input in the configuration bar; and
in response to receiving a parameter user interaction with the interactive parameter object;
display in a list display object at least one additional pivot table parameter of the pivot table related to the at least one pivot table parameter;
receive a list user interaction with the list display object, wherein the list user interaction selects the at least one additional pivot table parameter; and
set a value of the interactive parameter object based on the selected at least one additional pivot table parameter; and
generate the pivot table based on at least the value of the interactive parameter object.

8. The one or more computer readable storage media of claim 7 wherein, to receive a user input defining the at least one pivot table parameter, the program instructions direct the processing system to receive text in the configuration bar; and wherein, to display the at least one interactive parameter object adjacently to the user input, the program instructions direct the processing system to replace text entries of the at least one pivot table parameter with the interactive parameter object.

9. The one or more computer readable storage media of claim 7 wherein the program instructions further direct the processing system to display sample text illustrating example key words used to identify the at least one pivot table parameter and an operation to perform with respect to the at least one pivot table parameter, and generate the pivot table based on the at least one pivot table parameter and the operation.

10. The one or more computer readable storage media of claim 7 wherein the program instructions further direct the processing system to: create a preview of the pivot table based on the at least one pivot table parameter; and enable display of the preview.

11. A computing apparatus comprising:
one or more computer readable storage media;
a processing system operatively coupled with the one or more computer readable storage media; and
program instructions stored on the one or more computer readable storage media for creating a pivot table that, when executed by the processing system, direct the processing system to at least:
render a view in a user interface to a spreadsheet application, the view comprising a formula bar;
in response to receiving a user initialization input, replace the formula bar with a configuration bar;
receive a user configuration input, via the configuration bar, defining at least one pivot table parameter of the pivot table;
based on the at least one pivot table parameter, create an interactive parameter object;
display the interactive parameter object adjacently to a portion of the user input in the configuration bar;
receive a parameter user interaction with the interactive parameter object;
in response to receiving the parameter user interaction with the interactive parameter object, display in a list display object at least one additional pivot table parameter of the pivot table related to the at least one pivot table parameter;
receive a list user interaction with the list display object, wherein the list user interaction selects the at least one additional pivot table parameter; and
set a value of the interactive parameter object based on the selected at least one additional pivot table parameter; and
generate the pivot table based on at least the value of the interactive parameter object.

12. The computing apparatus of claim 11 wherein the program instructions further direct the processing system to: replace the configuration bar with the formula bar after generation of the pivot table.

13. The computing apparatus of claim 11 wherein the user initialization input includes, at least in part, a selection of at least one of a row and a column that includes a string of text, and wherein the at least one pivot table parameter comprises the string of text.

14. The computing apparatus of claim 11 wherein the configuration bar is displayed in a space formerly occupied by the formula bar.

15. The computing apparatus of claim 11 wherein, to enable display of the interactive parameter object, the program instructions direct the processing system to replace the at least one pivot table parameter with the interactive parameter object.

16. The computing apparatus of claim 11 wherein the program instructions further direct the processing system to enable display of sample text illustrating example key words used to identify the at least one pivot table parameter and an operation to perform with respect to the at least one pivot table parameter, and generate the pivot table based on the at least one pivot table parameter and the operation.

17. The computing apparatus of claim 12 wherein the program instructions further direct the processing system to:
   receive a subsequent user configuration input defining a subsequent pivot table parameter;
   create a preview of the pivot table based on the at least one pivot table parameter and based on the subsequent pivot table parameter; and
   enable display of the preview.

\* \* \* \* \*